March 26, 1963 H. ROTH ET AL 3,083,330
TRANSISTOR POWER SUPPLY
Filed July 23, 1958
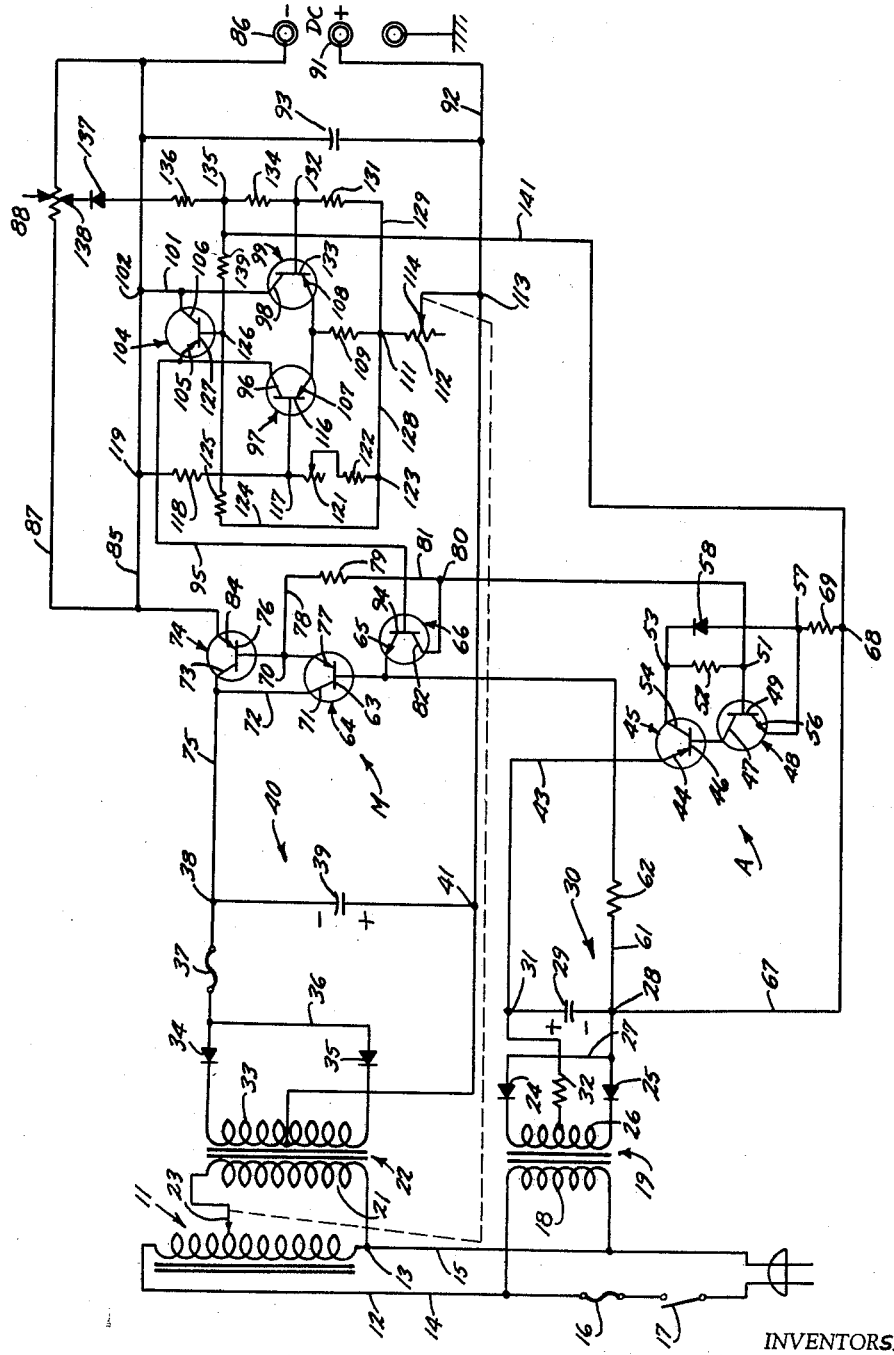
INVENTORS.
HERBERT ROTH
MILTON GELLER
BY
Dean, Fairbank & Hirsch
ATTORNEYS.

3,083,330
TRANSISTOR POWER SUPPLY
Herbert Roth, Bayside, and Milton Geller, Forest Hills, N.Y., assignors to Power Designs, Inc., Richmond Hill, N.Y., a corporation of New York
Filed July 23, 1958, Ser. No. 750,376
3 Claims. (Cl. 323—22)

This invention relates to the art of power supplies and more particularly to voltage regulated transistor power supplies.

As conducive to an understanding of the invention, it is noted that if a short circuit occurs in the load being supplied by the power supply, and the current drain is more than the power supply is capable of normally delivering, transistors in the power supply may burn out with resultant disablement thereof and need for replacement. In addition, if the power supply passes such high current to the load, further damage could be caused to the load by such high current delivered thereto, beyond that which caused the initial short circuit, and such damage may be caused whether the short circuit is of long or short duration.

Where there is a partial short circuit in the load such as is caused by a leaky capacitor or a shorted resistor and the current requirement of the load increases slightly beyond the normal capacity of the power supply or the load itself, continued supply of such excess current may cause eventual burn-out of the transistors of the power supply or may cause failure of other components of the load.

Where, to protect the power supply, a fuse is used, which has a reaction time in the order of milliseconds, while the transistor reaction time is in the order of microseconds, the transistor will burn out before the protective fuse can break the circuit thereto.

Where a relay is employed which has a coil in series with the load so that when the current exceeds a predetermined amount, the relay will be energized to open the circuit to the source of power, as the relay contact closure time is in the order of milliseconds the transistor will burn out before the relay can break the circuit thereto.

Where a resistive network is used to limit the maximum current the power supply can deliver, as the network is always in circuit, its power consumption is wasteful and in addition with sustained short circuit transistors in the power supply will still dissipate excess heat and burn out, the protective network only being effective for momentary shorts in the load and also only as a protection for the load but not the power supply.

It is accordingly among the objects of the invention to provide a transistor power supply that is compact, having but few parts and that may readily be assembled, that will provide a regulated output voltage and that incorporates a protective circuit which in addition to protecting the transistors in the power supply from burning out, will also protect the load against a continued supply of excess current from the power supply due to short circuits of momentary or long duration in the load.

According to the invention these objects are accomplished by the arrangement and combination of elements hereinafter described and particularly recited in the claims.

In the accompanying drawing the single FIGURE is a circuit diagram of one illustrative embodiment of the invention.

Referring now to the drawing, the equipment comprises a Variac 11, the input terminals 12 and 13 of which are connected respectively to power lines 14, 15, one of said lines illustratively line 14 having a fuse 16 and an "on," "off" switch 17 in series therewith.

Connected to lines 14 and 15 is the primary winding 18 of a transformer 19 and one side of the primary 21 of a transformer 22 is connected to line 15 and the other side of said primary 21 to the wiper arm 23 of the Variac 11 so that the input to transformer 22 may be varied.

Referring to the transformer 19, rectifier diodes 24, 25 are connected to each side of the secondary 26 of said transformer, said diodes being connected by lead 27 which is also connected to junction 28 and to one side of a capacitor 29. The other side of capacitor 29 is connected to junction 31 and through resistor 32 to the midpoint of the secondary winding 26 of transformer 19.

Thus the circuit associated with transformer 19 forms a full wave rectifier power supply 30, the unregulated output voltage appearing between junctions 28 and 31, illustratively being positive at junction 31 and negative at junction 28.

Similarly, each side of the secondary 33 of transformer 22 has a rectifier diode 34, 35 connected thereto, said diodes being connected by lead 36, which is also connected through fuse 37 to junction 38 and to one side of a capacitor 39. The other side of capacitor 39 is connected to junction 41 and to the midpoint of the secondary winding 33 of transformer 22.

The circuit associated with transformer 22 also forms a full wave rectifier power supply 40, the unregulated output appearing between junctions 38 and 41, illustratively being positive at junction 41 and negative at junction 38.

Junction 31 is connected by lead 43 to the emitter 44 of transistor 45 illustratively of the PNP type. The base 46 of transistor 45 is connected to the collector 47 of transistor 48 illustratively of the NPN type, the base 49 of said transistor 48 being connected to junction 51, and through resistor 52 to junction 53 which is connected to the collector 54 of transistor 45.

The emitter 56 of transistor 48 is connected to junction 57 and then through "Zener" diode 58 to junction 53. The "Zener" diode provides a reference voltage that is substantially independent of current flow therethrough.

Junction 28 is connected by lead 61 through resistor 62 to the base 63 of driver transistor 64 illustratively of the PNP type and to the emitter 65 of transistor 66 illustratively of the NPN type. In addition, junction 28 is connected by lead 67 to junction 68, a resistor 69 being connected between junctions 57 and 69.

The collector 71 of transistor 64 is connected by lead 72 to the collector 73 of series regulating transistor 74 illustratively of the PNP type and by lead 75 to junction 38. The base 76 of transistor 74 is connected to the emitter 77 of transistor 64 and by lead 78 through resistor 79 and lead 81 to the collector 82 of transistor 66 and to junction 80 and then to junction 51.

The emitter 84 of transistor 74 is connected by lead 85 to the negative D.C. output terminal 86 and by lead 87 through potentiometer 88 to said terminal 86. The positive D.C. output terminal 91 is connected by lead 92 to junction 41 and a capacitor 93 is connected in parallel with said output terminals to lines 85, 92 respectively.

The base 94 of transistor 66 is connected by lead 95 to the collector 96 of transistor 97 illustratively of the PNP type which forms part of a balanced differential amplifier. The collector 98 of transistor 99 also illustratively of the PNP type and which also forms part of the differential amplifier is connected by lead 101 to lead 85 as at junction 102.

Connected across said collectors 96 and 98 is a control transistor 104 illustratively of the PNP type, the emitter 105 of transistor 104 illustratively being connected to lead 95 and the collector 106 to lead 101.

The emitters 107, 108 of transistors 97, 99, are connected together and then connected through resistor 109 to junction 111 which is connected through rheostat 112 to lead 92 as at junction 113, the wiper arm 114 of rheostat 112 being ganged with the wiper arm 23 of the Variac to move in unison therewith.

The base 116 of transistor 97 is connected to junction 117 and thence through resistor 118 to line 85 at junction 119. Junction 117 is connected through variable resistor 121 and resistor 122 in series therewith to junction 123, the latter being connected by lead 124 through resistor 125 to junction 126 and to the base 127 of transistor 104. Junction 123 is connected by lead 128 to junction 111 and thence by lead 129 through resistor 131 to junction 132, the latter being connected to base 133 of transistor 99 and through resistor 134 to junction 135. Junction 135 is connected through resistor 136 and "Zener" diode 137 to the wiper arm 138 of potentiometer 88, and through resistor 139 to junction 126, a lead 141 connecting junction 135 to junction 68.

OPERATION

In the operation of the equipment, the closing of power switch 17 will connect a source of alternating current, which illustratively is 105–125 volts 60 cycle; to the primary winding 18 of transformer 19 and also through Variac 11 to the primary winding 21 of transformer 22.

In conventional manner, unregulated D.C. potential will appear across capacitors 29 and 39 between junctions 28, 31 and 38, 41 respectively, of unregulated power sources 30 and 40 which are applied to the auxiliary power supply A and the main power supply M, said power supplies providing a constant current and constant voltage respectively.

Auxiliary Power Supply

The unregulated voltage across capacitor 29 is also across the emitter 44 of transistor 45 and junction 68. Hence current will flow from the emitter 44 of transistor 45 to collector 54 of transistor 45, through "Zener" reference diode 58 and resistor 69 to junction 68. Since the characteristics of the "Zener" diode is such that the voltage across the diode is constant independently of the current therethrough, there will be a fixed voltage across diode 58, the resistor 69 limiting the current flow through diode 58 to protect the latter. This fixed voltage is also across the collector 54 of transistor 45 and the emitter 56 of transistor 48.

Since the voltage drop between the base 49 and emitter 56 of transistor 48 is substantially constant (which is inherent in transistors) and since the voltage drop across diode 58 is also substantially a constant, then it follows that the voltage across resistor 52 will be substantially constant with a given line voltage which appears as unregulated D.C. across capacitor 29.

Since the base of transistor 48 is therefore fixed as to voltage value with respect to its emitter, the amount of current flowing from collector to emitter of transistor 48 is fixed. Consequently, the base drive of transistor 45 is fixed, causing the current flow from emitter to collector of transistor 45 to be fixed, so that the voltage across emitter to collector of transistor 45 is fixed.

This is the normal condition with a given line voltage. Assuming that the line voltage should increase, since the load is fixed, then transistor 45 can only pass the fixed current, and with increase in line voltage, the drop across transistor 45 will increase accordingly, so that the voltage to the remaining portion of the auxiliary power supply A remains constant. Hence, as the voltage across resistor 52 remains constant, the current through resistor 52 will remain constant. In effect, transistor 45 is a variable resistor, the voltage across which is determined by the applied line voltage.

Thus, the current output of the auxiliary power supply A is independent of line voltage variations.

Any variations in the current requirements of the load on the auxiliary power supply A, will attempt to change the current flow through resistor 52 which would attempt to change the voltage at the base 49 of transistor 48. This will cause the base of transistor 48 to become either more negative or more positive with respect to the emitter of transistor 48 which will control the amount of current passing from collector to emitter of transistor 48. As a result, the base drive of transistor 45 is varied.

Thus, if the current demanded of the load on the auxiliary power supply A decreases, then the current through resistor 52 will attempt to decrease and the voltage drop across resistor 52 will attempt to decrease so that the voltage on the base of transistor 48 will attempt to become more positive. Consequently, the amount of current flow from collector to emitter of transistor 48 will increase, thereby increasing the base drive of transistor 45 to increase the current flow from emitter to collector of transistor 45.

Consequently, more current will flow through resistor 52 to increase the voltage across resistor 52 to make the base of transistor 48 less positive thereby achieving equilibrium and regulation.

Main Power Supply

The unregulated voltage cross capacitor 39 of the power supply 40 is also across the collector 73 of transistor 74 and junction 113 which is connected to the D.C. output 91. Hence, current will flow from junction 113 through the load across output terminals 91, 86, line 85, emitter to collector of transistor 74.

In addition, there is constant current flow from the auxiliary power supply A. The current flows from resistor 52, the lower portion of which is more negative than the upper portion as the lower portion of resistor 52 is connected through the load of power supply A to negative junction 68, while the upper portion is connected through transistor 45 to the positive side of capacitor 29. The current through resistor 52 divides at junction 80 of the collector 82 of transistor 66 and the resistor 79.

The current which passes from collector 82 of transistor 66 to emitter 65 thereof is returned to junction 28 through resistor 62. The current which flows through resistor 79, divides at junction 70 of the emitter 77 of transistor 64 and base 76 of transistor 74. The value of resistor 79 is such that at all times the voltage across the emitter to collector of transistor 66 will be sufficient for such transistor to remain within its operating region. The portion of the current passing from emitter to base of transistor 64 is returned through resistor 62 to junction 28, the negative side of the unregulated power supply 30.

The purpose of resistor 62 is to set the operating point of transistor 64 by limiting the current which flows from its emitter to base. It also limits the current flowing from collector to emitter of transistor 66.

The portion of the current forced through the base to emitter of transistor 74 goes through potentiometer 88, diode 137 and resistor 136, line 141 to the negative side of the unregulated power supply 30. The current does not flow through the load for it is more positive.

Thus, the paths of current both from the auxiliary power supply A and the power supply 40 to the main power supply M have been traced.

Assuming there is a fixed voltage across capacitor 39 and a fixed load across output terminals 86, 91 there is no need for regulation which only occurs with changes in either voltage or load, the purpose of the main power supply M being to provide a constant voltage across the output terminals 86, 91 independent of changes in the resistance of the load or changes in the line voltage within the safe limits of operation, i.e., current requirements of the load.

Assuming that the line voltage and the load are constant, the constant desired voltage across the load also appears across junctions 119 and 113; acros junctions 102 and 113 and potentiometer 88 and junction 113.

Since the voltage across potentiometer 88 and junction 113 was constant the voltage at the base of transistor 99 is constant based on the values of potentiometer 88, diode 137, resistors 136, 134, 131 and 112. Also the voltage at the emitter of transistor 99 is constant based on the values of resistors 112, 109, emitter to collector voltage of transistor 99 (between junctions 102 and 113).

Therefore, the current from emitter to collector of transistor 99 is fixed.

The current through potentiometer 88, diode 137 and resistor 136 is from the auxiliary power supply A. Therefore the voltage across potentiometer 88, diode 137 and resistor 136 is fixed.

Similarly, the base voltage of transistor 97 is also constant by virtue of resistors 118, 121, 122 and 112. The voltage at emitter of transistor 97 is fixed by virtue of resistors 112, 109, emitter to collector voltage of transistor 97, base-emitter voltage of transistor 66, base-emitter voltage of transistor 64, base-emitter voltage of transistor 74. Therefore, current flow from emitter to collector of transistor 97 is constant.

Consequently, there is a constant base drive to transistor 66 so that a constant current flows from collector to emitter of transistor 66. (This current is derived from auxiliary power supply A as previously described.)

Since we also had current flow from auxiliary power supply A through resistor 79, and the emitter to base of transistor 64, both currents through transistors 66 and 64 will pass through resistor 62.

Therefore the constant current flow from transistor 66 gives constant base drive for transistor 64. With constant base drive on transistor 64, constant current will flow from emitter to collector of transistor 64. Therefore, there will be a constant base drive for transistor 74 so the current from emitter to collector of transistor 74 is constant.

Assuming that the line voltage increases which will appear as an increased voltage across capacitor 39, since the load across output terminals 86, 91 is fixed, then transistor 74 can only pass the fixed current. Consequently, with an increase in line voltage the drop across transistor 74 will increase accordingly so that the voltage to the remaining portion of the main power supply and hence to output terminals 86, 91 will remain constant.

It is to be noted that the base of transistor 99 is returned to the negative line through resistors 134, 136, diode 137, and potentiometer 88. The base of transistor 97 is returned to the negative line through resistor 118. The determination of current flow through the emitter to base of transistor 97 is determined by the value of resistor 118 which determines the base drive of transistor 97. Similarly, the determination of current flow through emitter to base of transistor 99 is determined by the value of resistor 134 plus the constant voltage across potentiometer 88, diode 137, resistor 136 which is fixed by reason of the constant current from the auxiliary power supply A, as previously described.

In addition, the fixed voltage across potentiometer 88, diode 137 and resistor 136 is in opposite polarity to the voltage across resistor 134.

It is to be noted that the transistors 97 and 99 form part of a balanced differential amplifier. Thus, a current change through transistor 99 has a reverse effect through transistor 97, one current rising in value and the other falling.

The differential amplifier includes a bridge that has resistor 118 in one arm; resistors 121, 122 in series in an adjacent arm, resistor 131 in a third arm opposed to resistor 118 and potentiometer 88, diode 137, resistors 136 and 134 in a fourth arm, the bases of transistors 97 and 99 being connected between resistors 118, 121 and resistors 131, 134.

The values of the components of the bridge are so chosen that the voltage across the bridge at balance is slightly offset from zero in normal condition.

Thus, the voltage ratio of the components of the bridge is as follows:

$$\frac{R\text{-}118}{R\text{-}121, 122} = \frac{(P\text{-}88, \text{diode } 137, R\text{-}136) + R\text{-}134}{R\text{-}131}$$

where

R=Resistor;
P=Potentiometer;

and (P-88, diode 137, R-136)=S

The voltage across S is fixed due to constant current therethrough and it serves as the required reference for the regulating action of the circuit.

Since it is desired to relate any voltage changes to the constant reference voltage, it is necessary to hold the base of transistor 99 constant. This is accomplished by making the value of resistor 134 many times more than the value of resistor 118 so that for a given voltage output change, the base emitter drive of transistor 97 will be much more sensitive than that of transistor 99. Thus, since resistor 118 is small as compared to resistor 134, with a given voltage change, the current through resistor 118 will increase a greater percent than the current through resistor 134. For example:

If

Resistor 118=10 ohms

Resistor 134=100 ohms and 10 volts across each, then current through $$R\text{-}118 = \frac{10}{10} = 1 \text{ amp.}$$

current through $$R\text{-}134 = \frac{10}{100} = .1 \text{ amp.}$$

But, if 11 volts across each, then current through $$R\text{-}118 = \frac{11}{10} = 1.1 \text{ amp.}$$

current through $$R\text{-}134 = \frac{11}{100} = .11 \text{ amp.}$$

Therefore, with one volt change in voltage the change in current through R-118 is 10 percent and change in current through R-134 is 1 percent, so it is the ratio of $$\frac{R\text{-}118}{R\text{-}134}$$

that determines the sensitivity.

Consequently, a given voltage change will have much more effect on the base drive of transistor 97 than on the base drive of transistor 99.

Therefore, with respect to transistor 97, the base drive of transistor 99 may be considered relatively constant with changing output voltage.

Now assuming that the line voltage is constant, and due to an increase in resistance of the load across output terminals 86, 91, the current demand tends to decrease. This will instantaneously tend to increase the output voltage from the main power supply M.

Instantaneously the emitter of transistor 97 which is returned to the positive line through resistors 109, 112 tries to get more positive with respect to its base which is returned to negative line through resistor 118. The base of transistor 97 which is also returned to the positive line through resistors 121, 122, 112 tends to get more positive with respect to the negative line.

Since, as previously described, transistor 97 is more sensitive to output voltage changes than transistor 99, then the change will have little effect on the base drive of transistor 99.

Since the emitter of transistor 97 becomes more positive than its base, this tends to drive transistor 97 to saturation so that the emitter to collector current increases rapidly causing an increase in the voltage drop across resistor 109 which causes the emitters of transistors 97 and 99 to become less positive with respect to the negative line and the bridge is returned to its balanced condition.

The instantaneous increase in the flow of current out of the emitter and collector of transistor 97 serves to increase the base drive of transistor 66.

As the signal to the base of transistor 66 increases, more current flows from the collector to emitter thereof. Since the source of the current from collector to emitter of transistor 66 and from emitter to base of transistor 64 through resistor 79 is from the auxiliary power supply A and are in parallel, increase of current through transistor 66 results in a decrease of current through the base emitter of transistor 64. Hence, there is less signal base drive for transistor 64 so that less current flows from the emitter to collector thereof and there is less base drive for transistor 74, which is therefore driven toward cut-off. Consequently, the voltage across transistor 74 increases to reduce the output voltage for the load, thereby maintaining the output voltage the same regardless of the variation in the resistance of the load.

The series regulating transistor 74 is in such a location that when it passes the current drawn by the load across output terminals 86, 91 since $W=EI$, if I is fixed and E (voltage) across transistor 74 should increase, then W (watts) would increase in direct proportion. Since the dissipation capability of transistors is low, it is necessary to control the voltage across transistor 74 with a given current drain due to a given load to prevent burning out of the transistor.

Thus, assuming that the output load is a constant and with 15 volts output across terminals 86, 91 with an input of 17 volts, there would be 2 volts across the series transistor 74. Assuming that the current drain is 1 ampere then $W=EI=2\times1=2$ watts. Now assuming that the desired output voltage is 5 volts, with the current drain of the load still 1 ampere, and the supply input voltage still 17 volts, then 12 volts will appear across the transistor 74 and $W=EI=12\times1=12$ watts which is excessive.

However, by reducing the input voltage from Variac 11 proportionally to the desired output voltage which is controlled by resistor 112, the voltage across transistor 74 can be maintained relatively constant.

Safety Circuit

Means are provided to protect the load across output terminals 86 and 91. To this end, it is noted that during normal operation the base of transistor 104 is more positive than its emitter since it is returned through resistors 125 and 112 to junction 113 connected to the positive line whereas the emitter is connected to the negative line through base emitter of transistor 66, base emitter of transistor 64, and base emitter of transistor 74.

Since the base-collector of a transistor draws little current (in the order of one micro-ampere) then the base of transistor 104 is essentially at the potential of the positive line and transistor 104 is cut off.

When there is a short circuit across the output 86, 91, the voltage across the load will immediately drop. This short circuit also causes the voltage across the bridge arrangement of the balanced differential amplifier to drop to zero.

Since the voltage across potentiometer 88, diode 137 and resistor 136 is fixed, the collector of transistor 104 becomes positive with respect to its base connected through resistor 139 to resistor 136 which is returned to the negative side of the auxiliary power supply A. Hence, the base of transistor 104 is instantly pulled negative with respect to its collector and the base is also more negative than the emitter which is returned to the negative side of the main power supply M through base-emitter of transistor 66, base-emitter of transistor 64 and the base emitter of transistor 74.

This causes transistor 104 to act like a bilateral transistor since the collector of transistor 104 is more positive than its emitter and since the base is more negative than either the pseudo collector or pseudo emitter. Transistor 104 will have a large flow of current from collector to emitter.

This current appears as increased drive current to the base of transistor 66 which is driven into saturation so that the current from collector to emitter of transistor 66 is at its maximum.

Since the source of the current from the collector to the emitter of transistor 66 and from the emitter to the base of transistor 64 through resistor 79 is from the auxiliary power supply A and since these paths are in parallel, increase of current through transistor 66 results in a large decrease of current through the emitter base of transistor 64 which is driven into cut off.

By cutting off transistor 64 there is no emitter to base drive for transistor 74 so that it also cuts off and hence it absorbs the entire voltage from power supply 40.

This action occurs within the normal switching time of large power transistors, i.e., 30 to 40 microseconds.

Since transistor 74 is not conducting, it presents a very high impedance so that substantially no current can flow into the load across output terminals 86, 91 and hence there can be no further damage thereto other than that which initially caused the short circuit. In addition, the transistor 74 itself is not affected for with low current flow therethrough the heat dissipation ($W=EI$) is low.

Once transistor 104 conducts it can only be cut off by opening the output circuit across the terminals 86, 91 or by opening power switch 17.

Thus, if the short circuit should be removed and the load is still on, then the residual current flow into the load is dissipated and hence the base of transistor 104 remains negative and it conducts.

However, if the output circuit is opened, then the residual current through transistor 74 will flow through resistors 118, 121, 122 and 112 so that junction 123 becomes positive with respect to the negative line and hence the base of transistor 104 becomes more positive and it cuts off.

The circuit above described also solves the problem in power transistors, i.e., transistor 74, of the flow of $ICo$ which is the heating effect in transistors due to current flow from emitter through base to collector which tends to drive the transistor to saturation so that it loses control.

This $ICo$ effect is normally compensated by introducing a flow of current from the base to the emitter sufficient to overcome the current which could normally flow from emitter through base to the collector. This reverse current creates a net current that flows from the emitter to the base of transistor 74 sufficient to establish its correct operating point as a series regulator.

In the embodiment shown, this reverse current is obtained from the auxiliary power supply A, through resistor 79 and is returned to the auxiliary power supply A through potentiometer 88, diode 137 and resistor 136, lead 141. This same current also supplies the current for the reference voltage as previously described.

With the circuit above described, assurance is provided that in the event of short circuit in the load, regardless of its duration, substantially all the current thereto will be cut off with full protection of the load. In addition, the series regulating transistor is completely protected against burn-out due to excessive heat dissipation.

As many changes could be made in the above system, and many apparently widely different embodiments of this invention could be made without departing from the scope of the claims, it is intended that all matter contained

Having thus described our invention, what we claim as new and desire to secure by Letters Patent of the United States is:

1. A transistor power supply having an output to which a load may be connected, said power supply including a series regulating transistor controlling the voltage and current applied to the load, a balanced differential amplifier including a bridge circuit having a first current limiting means in one arm, a second current limiting means in the adjacent arm, a third current limiting means in a third arm opposed to said first arm and a fourth current limiting means in a fourth arm, said fourth current limiting means having an impedance means in series therewith, a constant current supply connected to said impedance means to provide a constant reference voltage thereacross, said output terminals being connected respectively to the junction between the first and fourth arms and the adjacent and third arms of said bridge, the voltage across said fourth current limiting means being in opposition to that across said impedance means, said differential amplifier including a first and second transistor each having a base connected respectively to the junctions between said first and adjacent arms and said third and fourth arms, said fourth current limiting means being of much greater value than said first current limiting means to render said first transistor much more sensitive to voltage changes than said second transistor, whereby upon variation in the current requirements of the load to effect unbalance of the bridge, the base drive of said second transistor will be substantially unaffected and the current flow through the first transistor will rapidly change in inverse relation to the change in the current requirement of the load, the output of said first transistor being electrically connected to said series regulating transistor to control the current flow therethrough in direct relation to the current requirement of the load so that the voltage across the series regulating transistor will vary in inverse relation to the requirements of the load, means to restore said bridge to balance substantially immediately after unbalance thereof and means controlled by a predetermined reduction in the voltage across the load across the output to effect cut off of said series regulating transistor whereby the current supplied to the load will be substantially cut off.

2. A transistorized power supply having an output to which a load may be connected, said power supply comprising a constant voltage source connected to said output, said constant voltage source including a series regulating transistor having a base, a second transistor having an emitter connected to said base, said second transistor having a base, a third transistor having an emitter connected to the base of said second transistor, said third transistor having a base, means to provide a constant current supply to the collector of said third transistor and the emitter and base of said second transistor and said series regulating transistor respectively, a control transistor normally biased to cut off, said control transistor having an emitter element and a collector element, one of said elements being connected to the base of said third transistor, means upon a predetermined reduction in the voltage across the load to effect conduction of said control transistor, whereby the base drive of said third transistor will be increased to effect a saturation thereof for flow of substantially all of the current from the constant current source through said third transistor and cutoff of said second transistor to cut off the base drive for the series regulating transistor to cut off the latter, whereby the current supply to the load will be substantially cut off.

3. A transistorized power supply comprising a main power supply having an output to which a load may be connected and having a series regulating transistor and a balanced differential amplifier including a transistor and a bridge circuit, an auxiliary power supply to provide a constant current output to provide a fixed reference voltage for the bridge, means upon variation in the current requirement of the load to effect momentary unbalance of the bridge to provide a corresponding inverse variation in the current output of said amplifier transistor, means controlled by the output of said amplifier transistor to effect variation in the current flow through said series regulating transistor in direct relation to the current requirement of the load, said means including an additional and second additional transistor in said main power supply, unregulated D.C. power sources for the main and the auxiliary power supplies, said series regulating transistor and said additional and second additional transistors each having a collector and emitter and a base, means connecting the collector and emitter of said series regulating transistor in series with the unregulated D.C. source for the main power supply and the output, means to provide current flow from said auxiliary power supply through the collector and emitter of said second additional transistor to one side of said unregulated D.C. power source for the auxiliary power supply and from said auxiliary power supply through one of the other two elements of the additional transistor and the base thereof to said one side of the unregulated D.C. power source, and through the base and one of the other two elements of said series regulating transistor, whereby upon variation in the current flow to the base of the second additional transistor, caused by variations in the output of said amplifier transistor, the current flow from the auxiliary power supply through the first additional transistor will be inversely varied to effect corresponding variation in the current flow through the series regulating transistor.

References Cited in the file of this patent

UNITED STATES PATENTS

| | | |
|---|---|---|
| 2,551,407 | Alder | May 1, 1951 |
| 2,751,549 | Chase | June 19, 1956 |
| 2,832,900 | Ford | Apr. 29, 1958 |
| 2,904,742 | Chase | Sept. 15, 1959 |
| 2,922,945 | Norris | Jan. 26, 1960 |